US008493617B2

(12) United States Patent
Murayama

(10) Patent No.: US 8,493,617 B2
(45) Date of Patent: Jul. 23, 2013

(54) IMAGE FORMING APPARATUS HAVING A FUNCTION FOR ADJUSTMENT OF IMAGE FORMING CONDITIONS

(75) Inventor: Kentaro Murayama, Kasugai (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 698 days.

(21) Appl. No.: 12/713,214

(22) Filed: Feb. 26, 2010

(65) Prior Publication Data

US 2010/0245865 A1 Sep. 30, 2010

(30) Foreign Application Priority Data

Mar. 27, 2009 (JP) ................................ 2009-079045

(51) Int. Cl.

| | |
|---|---|
| ***G06K 15/02*** | (2006.01) |
| ***H04N 1/40*** | (2006.01) |
| ***G03G 15/50*** | (2006.01) |
| ***G03G 21/20*** | (2006.01) |
| ***G03G 2215/0161*** | (2006.01) |

(52) U.S. Cl.

USPC ................ 358/1.9; 358/2.1; 399/42; 399/44; 399/301

(58) Field of Classification Search

None

See application file for complete search history.

(56) References Cited

U.S. PATENT DOCUMENTS

| | | | | |
|---|---|---|---|---|
| 5,812,903 | A * | 9/1998 | Yamada et al. | 399/42 |
| 7,218,870 | B2 | 5/2007 | Hirobe | |
| 7,432,494 | B2 | 10/2008 | Kanzaki | |
| 2005/0152706 | A1 | 7/2005 | Koie et al. | |
| 2005/0213999 | A1 | 9/2005 | Hirobe | |
| 2006/0002727 | A1 | 1/2006 | Kanzaki | |
| 2007/0258736 | A1 * | 11/2007 | Inui et al. | 399/301 |
| 2008/0292370 | A1 | 11/2008 | Murayama | |
| 2009/0263150 | A1 | 10/2009 | Fujimori et al. | |
| 2010/0239279 | A1 * | 9/2010 | Saitou et al. | 399/44 |
| 2012/0195650 | A1 * | 8/2012 | Ogawa et al. | 399/301 |

FOREIGN PATENT DOCUMENTS

| | | |
|---|---|---|
| CN | 1716116 A | 1/2006 |
| JP | 06-051600 | 2/1994 |
| JP | 08-286566 | 11/1996 |
| JP | 08-305108 | 11/1996 |
| JP | 2001-034030 | 2/2001 |

(Continued)

OTHER PUBLICATIONS

CN Office Action dated Nov. 30, 2011, corresponding Application No. 201010155675.5; English Translation.

(Continued)

*Primary Examiner* — Barbara Reinier

(74) *Attorney, Agent, or Firm* — Banner & Witcoff, Ltd.

(57) ABSTRACT

An image forming apparatus includes a forming portion, an adjusting portion and a control portion. The forming portion is configured to form an image, while the adjusting portion is configured to execute an adjustment for correcting a pre-selected adjustable image forming condition based on a measurement of an image formed by the forming portion. The control portion is configured to control execution of the adjustment achieved by the adjusting portion. Specifically, the control portion obtains a plurality of kinds of variation values, which individually indicate a different state variation capable of involving a state change in the pre-selected adjustable image forming condition. The control portion calculates a complex evaluation of the current state of the pre-selected adjustable image forming condition based on the plurality of kinds of variation values, and determines a starting time for execution of the adjustment based on the complex evaluation.

16 Claims, 10 Drawing Sheets

FOREIGN PATENT DOCUMENTS

| | | | |
|---|---|---|---|
| JP | 2001-092196 | | 4/2001 |
| JP | 2002-062709 | | 2/2002 |
| JP | 2003-098792 | | 4/2003 |
| JP | 2004-013101 | A | 1/2004 |
| JP | 2005-202110 | | 7/2005 |
| JP | 2005-274789 | A | 10/2005 |
| JP | 2005-338164 | | 12/2005 |
| JP | 2006-337818 | A | 12/2006 |
| JP | 2006-350383 | A | 12/2006 |
| JP | 2008-292516 | A | 12/2008 |
| JP | 2008-292811 | | 12/2008 |
| JP | 2008-309920 | A | 12/2008 |

OTHER PUBLICATIONS

JP Office Action dtd Mar. 15, 2011, JP Appln. 2009-079045, English Translation.

Extended EP Search Report dtd Jun. 28, 2010, EP Appln. 10156087.8.

* cited by examiner

IMAGE FORMING APPARATUS HAVING A FUNCTION FOR ADJUSTMENT OF IMAGE FORMING CONDITIONS

CROSS REFERENCE TO RELATED APPLICATION

The present application claims priority from Japanese Patent Application No. 2009-79045 filed on Mar. 27, 2009. The entire content of this priority application is incorporated herein by reference.

TECHNICAL FIELD

The present disclosure relates to an image forming apparatus, and particularly relates to an image forming apparatus having a function for adjustment of image forming conditions.

BACKGROUND

In an image forming apparatus such as a color printer, image forming conditions (e.g., color registration or image density) may vary in state with time, which can cause errors such as color registration errors or image density errors. In view of this, it has been proposed that the image forming apparatus have a function for adjusting the image forming conditions in order to correct the errors. Frequent execution of the adjustment ensures the quality of images to be formed by the imaging forming apparatus. However, the frequent execution of the adjustment has some disadvantages, such as prolongation of user waiting time or increase in consumption of ink or toner.

In order to prevent excessively frequent execution of the adjustment, some state variations capable of involving a state change in the image forming conditions are detected, and the adjustment is executed when any one of the detected values indicating the state variations (e.g., the number of printed sheets or the elapsed time since the previous execution of adjustment) exceeds a reference value.

This is because color registration errors, due to worn components or vibration during printing operations, may grow to considerable amounts when the number of printed sheets since the previous execution of adjustment has reached a predetermined threshold value, for example. The starting time for adjustment is determined so that the required image quality is maintained, generally assuming the probable maximum errors based on the detected state variations. Consequently, the frequency of execution of the adjustment can be slightly reduced while the required image quality is maintained, compared to periodic execution of the adjustment.

However, there is a need in the art to more accurately evaluate the degree of demand for adjustment of image forming conditions in order to achieve more timely execution of the adjustment.

SUMMARY

An image forming apparatus according to an aspect of the present invention includes a forming portion, an adjusting portion and a control portion. The forming portion is configured to form an image, while the adjusting portion is configured to execute an adjustment for correcting a pre-selected adjustable image forming condition based on a measurement of an image formed by the forming portion. The control portion is configured to control execution of the adjustment achieved by the adjusting portion. Specifically, the control portion obtains a plurality of kinds of variation values, which individually indicate a different state variation capable of involving a state change in the pre-selected adjustable image forming condition. The control portion calculates a complex evaluation of the current state of the pre-selected adjustable image forming condition based on the plurality of kinds of variation values, and determines a starting time for execution of the adjustment based on the complex evaluation.

BRIEF DESCRIPTION OF THE DRAWINGS

Illustrative aspects in accordance with the present invention will be described in detail with reference to the following drawings wherein.

DETAILED DESCRIPTION

An illustrative aspect of the present invention will be hereinafter explained with reference to FIGS. 1 to 10.

(General Construction of Printer)

Figure 1:
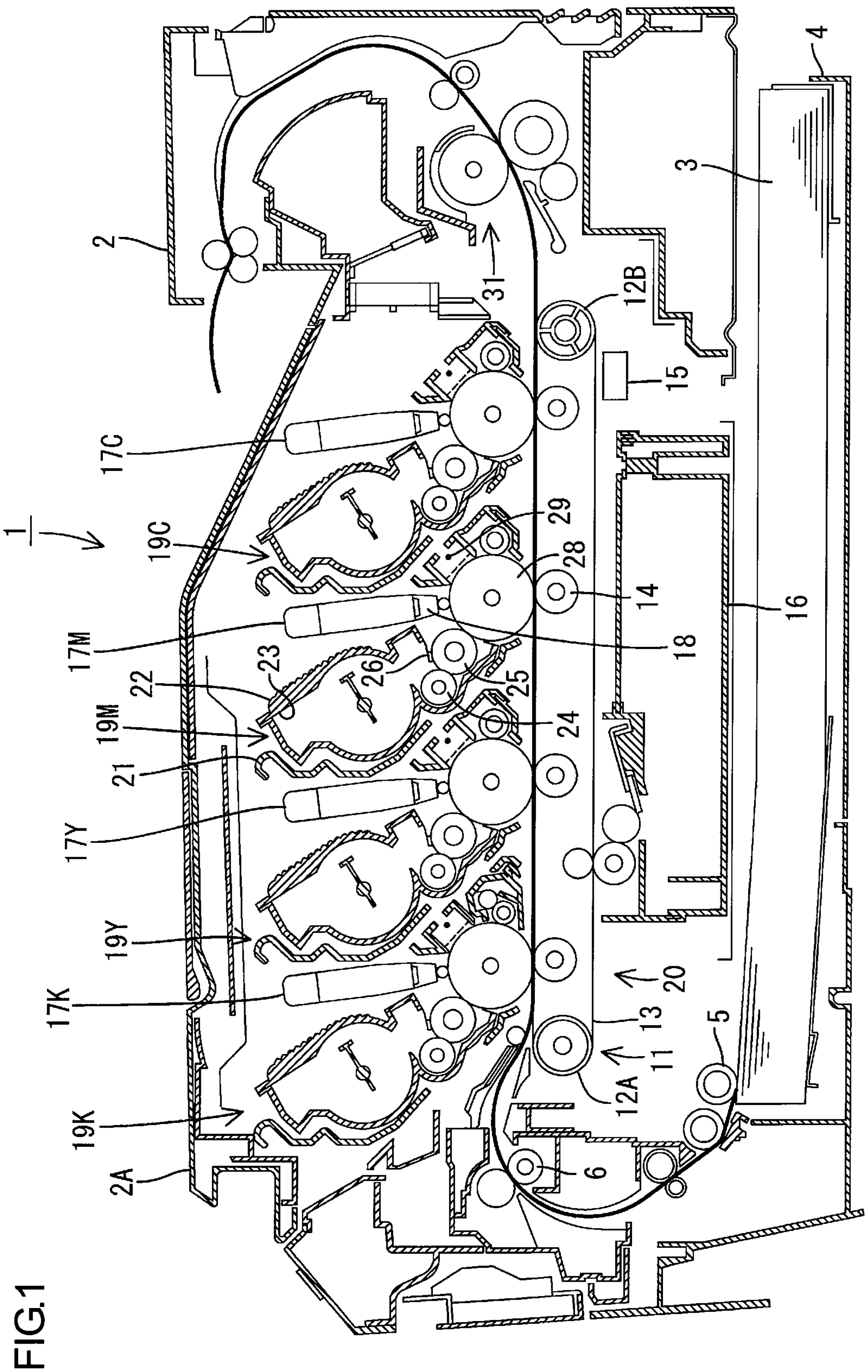
FIG. 1 is a side sectional view showing the general construction of a printer according to an illustrative aspect of the present invention.

FIG. 1 is a side sectional view showing the general construction of a printer 1, as an example of "an image forming apparatus" of the present invention. The printer 1 is a color printer of a direct-transfer tandem type, which can form a color image using toner of four colors (i.e., black, cyan, magenta and yellow). Hereinafter, the left side of FIG. 1 is referred to as the front side of the printer 1. In FIG. 1, some components having similar constructions are provided for four respective colors, and therefore some of symbols for the components are omitted.

The printer 1 has a casing 2, and an openable cover 2A provided on the top surface thereof. A feeder tray 4 is provided on the bottom of the casing 2, and a plurality of sheets 3 (or recording media) can be stacked on the feeder tray 4. A feeder roller 5 can forward the top one of the sheets 3 on the feeder tray 4 to registration rollers 6, which forwards the sheet 3 to the belt unit 11 of an image forming section 20.

The image forming section 20 (i.e., an example of "a forming portion") includes the belt unit 11, four exposure units 17K to 17C, four processing units 19K to 19C, a fixation unit 31 and the like.

The belt unit 11 includes a ring belt 13 (as an example of "a carrier"), which is stretched between an anterior belt-support roller 12A and a posterior belt-drive roller 12B. The belt 13 is made of polycarbonate, for example, and has a mirrored outer surface. The belt 13 is driven by rotation of the posterior belt-drive roller 12B. Thereby, the belt 13 rotates in clockwise direction in FIG. 1, so as to convey the sheet 3 (electrostatically adsorbed on the face of the belt 13) backward.

Four transfer rollers 14 are provided on the inner side of the belt 13, and are located across the belt 13 from respective photosensitive drums 28 described below (i.e., components of the respective processing units 19K to 19C). The belt unit 11 can be attached to and detached from the casing 2, when the cover 2A is open and the processing units 19K to 19C are completely removed from the casing 2.

A pattern sensor 15 (i.e., an example of an optical sensor) is provided below the belt 13, so as to face the downward-facing surface of the belt 13. The pattern sensor 15 is mainly used to detect a pattern formed on the belt 13 for measurement of color registration errors or image density errors, as described below. The details of the pattern sensor 15 will be explained later. Further, a cleaner 16 is provided below the belt unit 11, in order to collect toner, paper dust and the like, which can become attached to the belt 13.

The exposure units 17K, 17Y, 17M, 17C for four colors and the processing units 19K, 19Y, 19M, 19C for four colors are provided above the belt unit 11, and are alternately arranged in the front-back direction.

The exposure units 17K to 17C are supported on the under surface of the cover 2A. Each of the exposure units 17K to 17C has an LED head 18 at the bottom, which includes a plurality of LEDs arranged in a line. The exposure units 17K to 17C can individually perform line-by-line scan by emitting light from the LED head 18 to the surface of the corresponding photosensitive drum 28. At the time, the light emission by the exposure units 17K to 17C is controlled based on image data of respective colors, while being corrected based on position correction values and density correction values stored in the NVRAM 43, as described below.

Each of the processing units 19K to 19C includes a cartridge frame 21 and a developer cartridge 22 capable of being attached to and detached from the cartridge frame 21. The processing units 19K to 19C can be individually attached to and detached from the casing 2, when the cover 2A is open and thereby the exposure units 17K to 17C on the cover 2A are relegated to upper positions.

The developer cartridge 22 includes a toner container 23, a supply roller 24, a developer roller 25 and a layer thickness controlling blade 26. The toner container 23 can contain toner (or developer). The toner is supplied from the toner container 23 to the developer roller 25 by rotation of the supply roller 24. At the time, the toner is positively charged between the rollers 24, 25 by friction. Due to the layer thickness controlling blade 26, the toner on the developer roller 25 is held as a thin layer, and is further charged by friction.

In a lower section of the cartridge frame 21, the photosensitive drum 28 is provided with a scorotron charger 29. The surface of the photosensitive drum 28 is covered with a positively-electrifiable photosensitive layer, and therefore can be positively charged by the charger 29. The positively-charged area of the photosensitive drum 28 is exposed to the scanning light from the exposure unit 17K to 17C, and thereby an electrostatic latent image (corresponding to an image of the color to be formed on the sheet 3) is formed on the surface of the photosensitive drum 28.

Next, the toner on the developer roller 25 is supplied to the surface of the photosensitive drum 28 so as to adhere to the electrostatic latent image. Thus, the electrostatic latent image of each color is visualized as a toner image (or developed image) of the color on the photosensitive drum 28.

While the sheet 3 (being conveyed by the belt 13) passes between each photosensitive drum 28 and the corresponding transfer roller 14, a negative transfer voltage is applied to the transfer roller 14. Thereby, the toner images on the respective photosensitive drums 28 are sequentially transferred to the sheet 3, which is then forwarded to the fixation unit 31. The resultant toner image is thermally fixed to the sheet 3 by the fixation unit 31, and thereafter the sheet 3 is ejected onto the cover 2A.

(Electrical Configuration of Printer)

Figure 2:
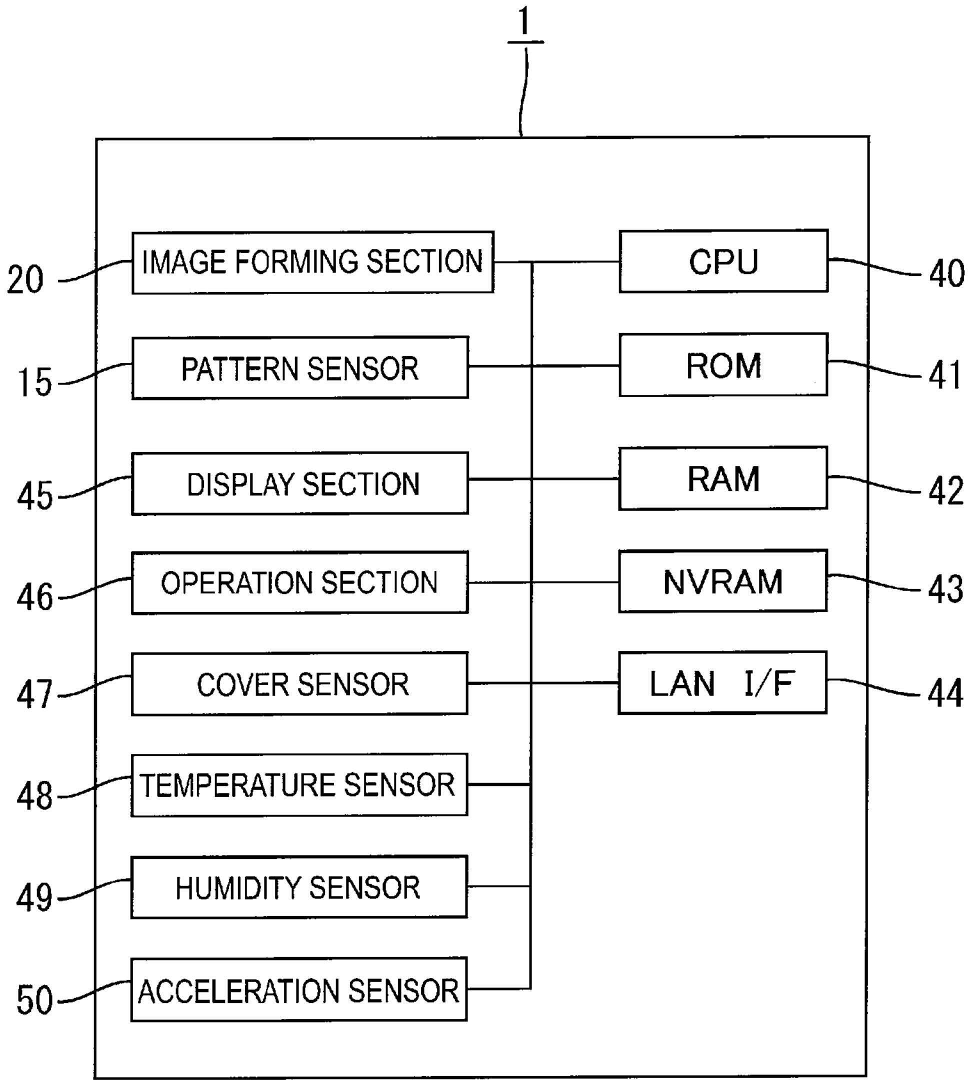
FIG. 2 is a block diagram schematically showing the electrical configuration of the printer.

FIG. 2 is a block diagram schematically showing the electrical configuration of the printer 1.

Referring to the figure, the printer 1 includes a CPU 40, a ROM 41, a RAM 42, an NVRAM (nonvolatile memory) 43 and a network interface 44. The above-described image forming section 20 and the pattern sensor 15 are connected to these components.

Various programs for controlling the operation of the printer 1 are stored in the ROM 41. The CPU 40 controls the operation of the printer 1 based on the programs retrieved from the ROM 41, while storing the processing results in the RAM 42 and/or the NVRAM 43. The network interface 44 is connected to an external computer (not shown) or the like, via a communication line, in order to enable mutual data communication.

The programs stored in the ROM 41 include programs for a printing and adjustment process and a determination process for adjustment execution, which can be executed by the CPU 40 (i.e., an example of "an adjusting portion", "a control portion" and "a counter") so as to execute print jobs received via the network interface 44 (i.e., an example of "a specifying portion") while adjusting or correcting some of adjustable image forming conditions. In the present illustrative aspect, an image forming position and an image density (as preselected adjustable image forming conditions) can be corrected by the adjustment. The details of these processes will be explained later.

The printer 1 includes a display section 45 and an operation section 46. The display section 45 includes a liquid crystal display and indicator lamps. Thereby, various setting screens, the operating condition and the like can be displayed. The operation section 46 includes a plurality of buttons, and thereby a user can perform various input operations.

The printer 1 further includes a cover sensor 47, a temperature sensor 48, a humidity sensor 49, an acceleration sensor 50 and the like. The cover sensor 47 can detect the open/close state of the cover 2A (as an example of a movable member). The temperature sensor 48 can detect the temperature in the printer 1, while the humidity sensor 49 can detect the humidity. The acceleration sensor 50 can detect the speed of acceleration caused by vibration of the printer 1 or a shock applied thereto.

(Pattern Sensor)

Figure 3:
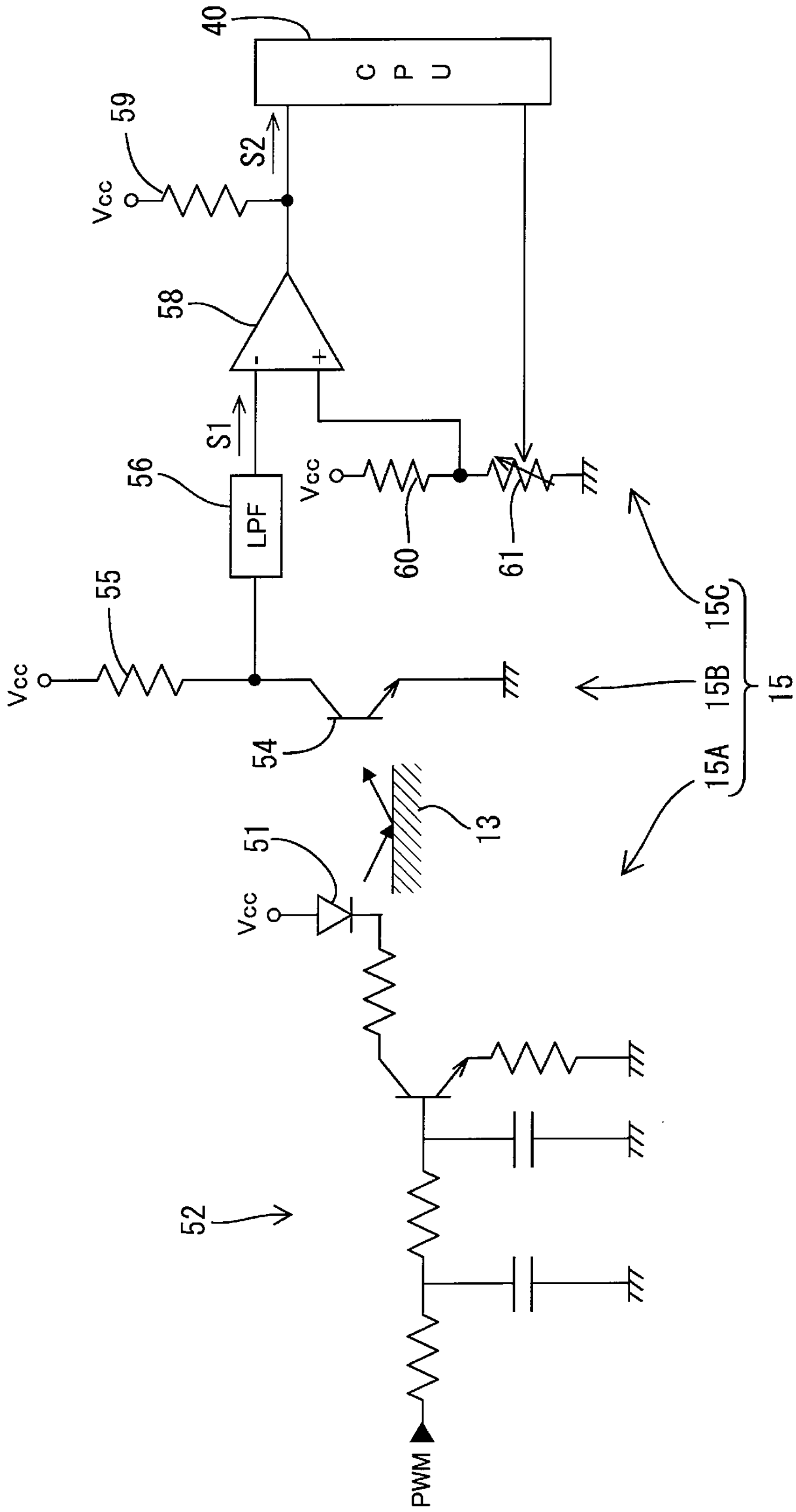
FIG. 3 is a diagram showing the circuit configuration of a pattern sensor.

FIG. 3 is a diagram showing the circuit configuration of the pattern sensor 15. Referring to the figure, the pattern sensor 15 includes a light emitting circuit 15A, a light receiving circuit 15B and a comparator circuit 15C. The light emitting circuit 15A includes a light emitting element 51 capable of emitting light to the belt 13. The light receiving circuit 15B includes a light receiving element 54 capable of receiving the light reflected by the belt 13. The comparator circuit 15C can compare the output of the light receiving circuit 15B with a reference level.

In the light emitting circuit 15A, the light emitting element 51 is formed of an LED. The cathode of the light emitting element 51 is connected to a PWM signal smoothing circuit 52, while the anode thereof is connected to the power line Vcc. The CPU 40 applies a PWM signal (or control signal) to the PWM signal smoothing circuit 52. The current to be applied to the light emitting element 51 can be adjusted by varying the PWM value (or duty cycle) of the PWM signal, and thereby the intensity of light emitted by the light emitting circuit 15A can be adjusted.

In the light receiving circuit 15B, the light receiving element 54 is formed of a phototransistor. The emitter of the light receiving element 54 is grounded, while the collector thereof is connected to the power line Vcc via a resistor 55. A light sensitive signal S1 having a level (or voltage value) corresponding to the amount of received light (i.e., the amount of light reflected from the belt 13) is outputted from the collector of the light receiving element 54 to the comparator circuit 15C via a low-pass filter 56. The low-pass filter 56 can be formed of a CR filter or an LC filter, for example, which can reduce noises in the light sensitive signal S1, such as spike noises.

The comparator circuit 15C includes an operational amplifier 58, resistors 59, 60 and a variable resistor 61. The output of the low-pass filter 56 is connected to the negative input terminal of the operational amplifier 58. The output terminal of the operational amplifier 58 is connected to the power line Vcc via the pull-up resistor 59 and also to the CPU 40.

The voltage-dividing circuit formed of the resistors 60, 61 supplies a divided voltage, which is applied as a reference level to the positive input terminal of the operational amplifier 58. The CPU 40 can set the reference level by varying the resistance value of the variable resistor 61. According to the construction, the operational amplifier 58 compares the level of the light sensitive signal S1 received at its negative input terminal, with the reference level, and outputs a binary signal S2 indicating the comparison result to the CPU 40.

(Printing and Adjustment Process)

Figure 4:
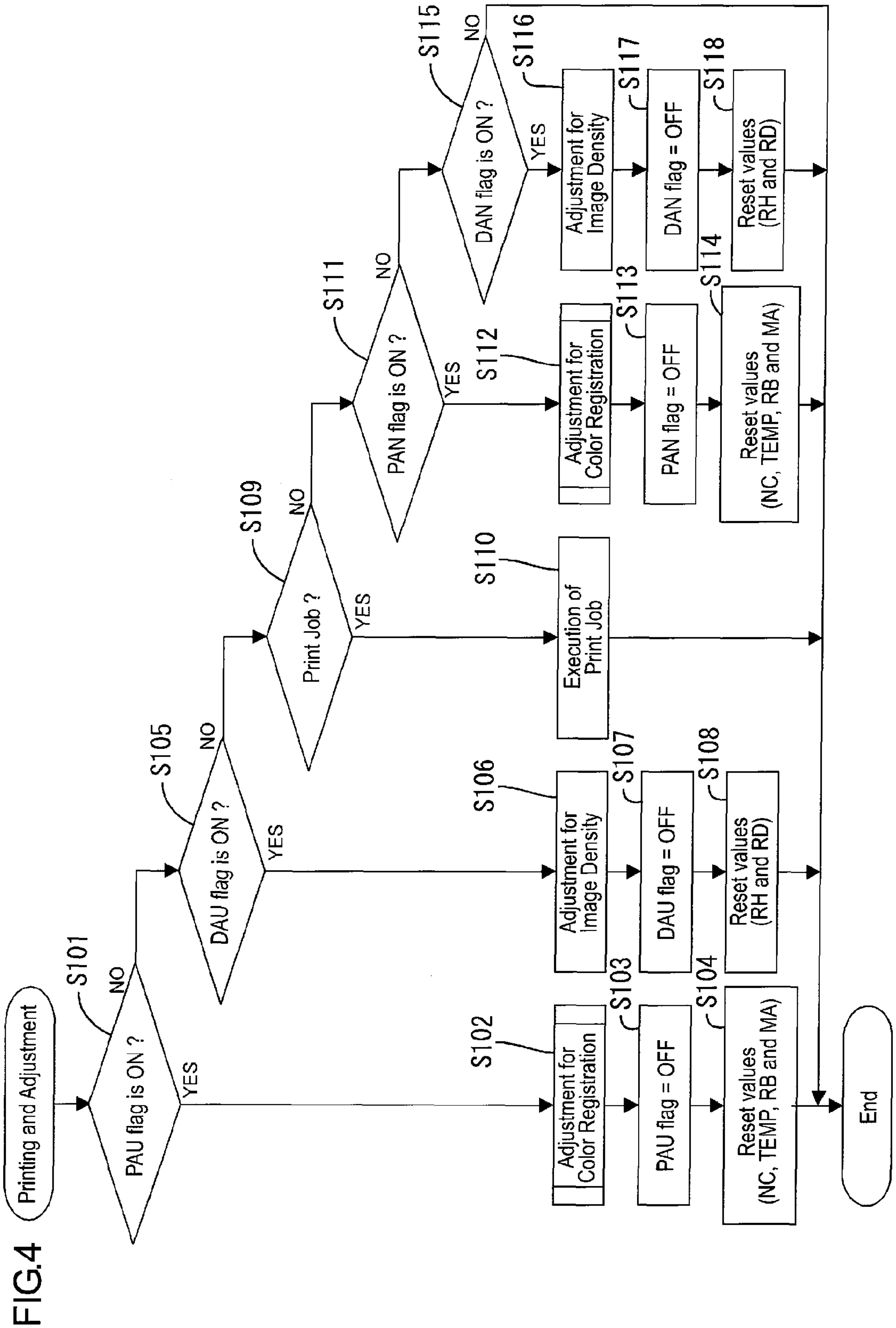
FIG. 4 is a flowchart of a printing and adjustment process.
Figure 5:
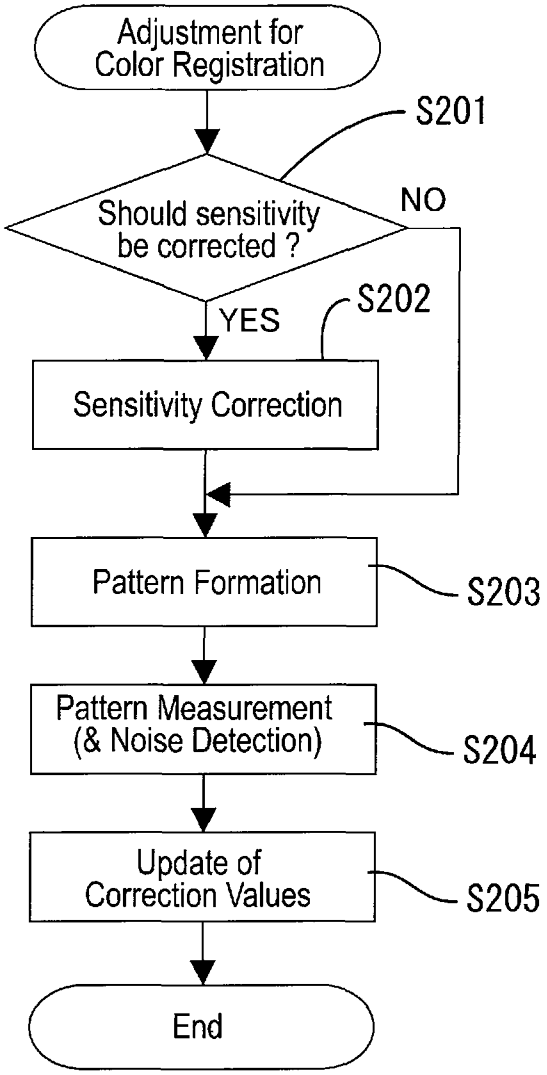
FIG. 5 is a flowchart of an adjustment process for color registration.
Figure 6:
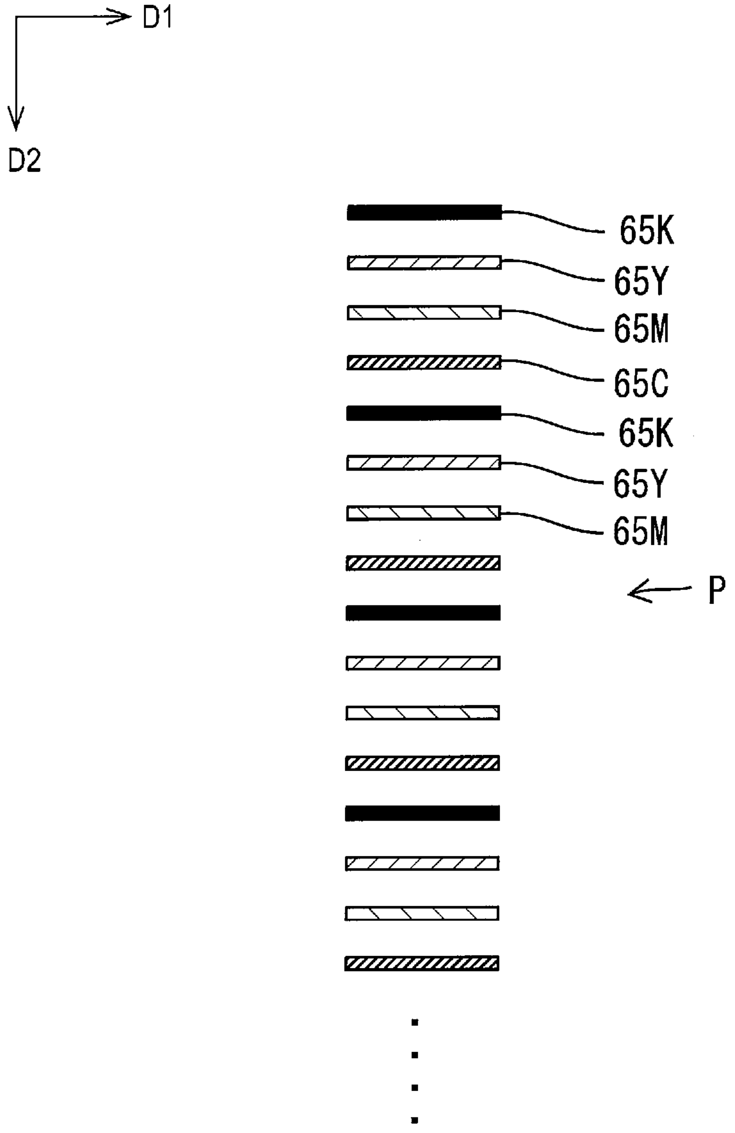
FIG. 6 is a diagram showing a pattern used for measuring color registration errors.
Figure 7:
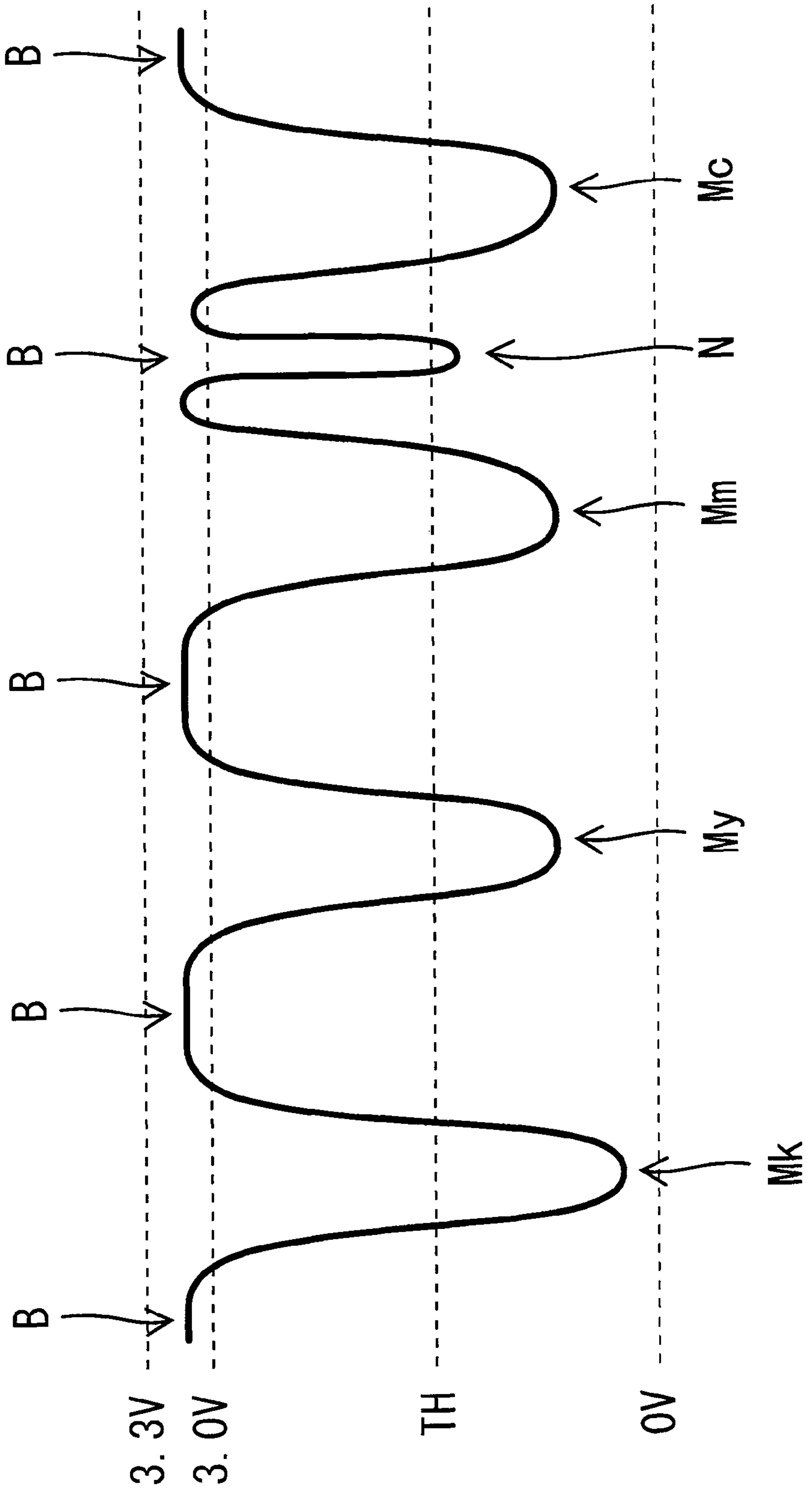
FIG. 7 is a graph showing the variation of a light sensitive signal with time during measurement of the pattern.

FIG. 4 is a flowchart of a printing and adjustment process. FIG. 5 is a flowchart of an adjustment process for color registration. FIG. 6 is a diagram showing a pattern "P" used for measurement of color registration errors. FIG. 7 is a graph showing the variation of a light sensitive signal S1 with time during the measurement of the pattern "P".

The printing and adjustment process shown in FIG. 4 is iteratively executed by the CPU 40 when the printer 1 is ON, and thereby the CPU 40 (i.e., an example of an adjustment controller) can prioritize and control execution of a printing process and an adjustment process. In the present illustrative aspect, the adjustment capable of being executed by the CPU 40 includes two kinds of adjustment, i.e., adjustment for correcting errors in image forming positions (or specifically, errors in color registration) and adjustment for correcting errors in image density, as described above.

The CPU 40 also periodically executes a determination process for adjustment execution as described below, in order to set four kinds of flags, i.e., a Position Adjustment Urgency (PAU) flag, a Position Adjustment Necessity (PAN) flag, a Density Adjustment Urgency (DAU) flag, and a Density Adjustment Necessity (DAN) flag. These flags are used to determine the priority of a printing process and an adjustment process, during the printing and adjustment process.

In the printing and adjustment process, referring to FIG. 4, the CPU 40 first determines at step S101 whether the PAU flag is ON or OFF. If it is determined that the PAU flag is ON (i.e., "Yes" is determined at step S101), an adjustment process for correcting color registration errors is executed at S102 as follows.

In the adjustment process, referring to FIG. 5, it is determined at step S201 whether sensitivity correction for the pattern sensor 15 should be performed. If a predetermined condition is satisfied (e.g., the elapsed time since the previous sensitivity correction has reached a predetermined time length), it is determined that sensitivity correction should be now performed (i.e., "Yes" is determined at step S201), and the sensitivity correction is actually performed at step S202. If "No" is determined at step S201, step S202 is skipped and the process proceeds to step S203.

During the sensitivity correction at step S202, the sensitivity of the pattern sensor 15 is adequately adjusted for later measurement of a pattern "P". Specifically, a proper intensity of light to be emitted by the light emitting circuit 15A (and the PWM value therefor) is determined based on measurement of light reflected from the bare surface of the belt 13, so that a light sensitive signal S1 can have a level close to the saturation level (e.g., 3.0V) when the light receiving circuit 15B receives the light reflected from the bare surface of the belt 13.

The light intensity can be set to be relatively low, when the belt 13 is relatively new and therefore its face has a high optical reflectivity. The optical reflectivity may decrease as the belt 13 ages, because of scratches and splotches on the belt 13. Therefore, the light intensity may have to be set to be relatively high for the old belt 13.

When the sensitivity correction at step S202 is completed, the process proceeds to step S203 where the CPU 40 causes the image forming section 20 to form a pattern "P" on the belt 13. The pattern "P" is an image pattern to be used for measurement of color registration errors, and includes marks 65K, 65Y, 65M, 65C of four colors as shown in FIG. 6. Each mark 65K, 65Y, 65M, 65C has a shape elongated along the main scanning direction D1, and the marks 65K, 65Y, 65M, 65C are arranged spaced apart along the secondary scanning direction D2.

Specifically, a black mark 65K, a yellow mark 65Y, a magenta mark 65M and a cyan mark 65C are arranged in this order, so as to form a mark group. In the present illustrative aspect, a plurality of mark groups are arranged spaced apart along the secondary scanning direction D2, so as to extend over the entire circumference of the belt 13, for example. The marks 65K, 65Y, 65M, 65C of four colors are equally spaced apart when there is no color registration error.

At step S204, the CPU 40 measures times when marks traverse the detecting point of the pattern sensor 15, based on a binary signal S2 from the pattern sensor 15, as follows.

FIG. 7 shows an example of variation of a light sensitive signal S1 with time during measurement of the pattern "P". The level of the light sensitive signal S1 is high when the light from the pattern sensor 15 is reflected by the bare surface of the belt 13 (i.e., at time points B in the figure), and is low when the light from the pattern sensor 15 is reflected by the marks 65K to 65C on the belt 13 (i.e., at time points Mk, My, Mm, Mc in the figure).

In the present illustrative aspect, the voltage applied to the power line Vcc of the light receiving circuit 15B is set to 3.3V. As described above, the light sensitive signal S1 has a level close to the saturation level (i.e., a level slightly exceeding 3.0V) when the light from the pattern sensor 15 is reflected by the bare surface of the belt 13. The reference level TH applied to the operational amplifier 58 is set by the CPU 40 to a middle level (e.g., 1.6V) between the level at time points B and the levels at time points Mk, My, Mm, Mc.

The CPU 40 measures the positions of the marks 65K to 65C based on times when the binary signal S2 switches between a high level and a low level during detection of the respective marks 65K to 65C.

As shown in FIG. 7, the light sensitive signal S1 may include a noise N caused by a damaged area of the face of the belt 13 such as a scratched area. The CPU 40 determines that a mark has been detected if the duration of the binary signal S2 being low level has reached a predetermined time length. It is determined that a noise has been detected if the low level of the binary signal S2 having a duration shorter than the predetermined time length has been detected. The number of noises detected during the measurement of the marks is counted, and is stored in the NVRAM 43.

Based on the result of the measurement of the marks 65K to 65C, the CPU 40 estimates errors in positions of marks 65Y, 65M, 65C of three colors (i.e., yellow, magenta and cyan, and hereinafter referred to as corrective colors), using the positions of black marks 65K as reference points. That is, the CPU 40 determines the estimated displacement amount of a mark 65Y, 65M, 65C of each corrective color from its proper position in the secondary scanning direction D2. The estimated displacement amounts of marks of each corrective color are averaged for all mark groups. A new correction value is calculated for each corrective color, so that the displacement amount indicated by the average value can be canceled by the new correction value.

Thus, the new correction values are calculated for respective corrective colors. At step S205, the correction values for the corrective colors, currently stored in the NVRAM 43, are updated or replaced with the new correction values. Then, the present adjustment process for color registration (at step S102 of FIG. 4) terminates.

In future operations for image formation, the positions of images of respective colors are corrected based on the correction values (i.e., position correction values) stored in the NVRAM 43, so that a color image on a sheet as a printing result will not include a color shift caused by color registration errors. Specifically, the timing of light emission during line scanning by the respective exposure units 17K to 17C is adjusted based on the position correction values so that color registration errors in the secondary scanning direction D2 can be prevented.

Returning to FIG. 4, when the adjustment process for color registration at step S102 is completed, the present printing and adjustment process proceeds to step S103 where the PAU flag is set to OFF. Further, at step S104, the CPU 40 resets four kinds of variation values (i.e., NC, TEMP, RB and MA) stored in the NVRAM 43, which indicate the number of opening/closing operations of the cover 2A, the temperature during adjustment, the number of rotations of the belt-drive roller 12B, and the maximum acceleration, respectively. The detailed explanations for these variation values NC, TEMP, RB and MA are as follows.

The CPU 40 detects an opening/closing operation of the cover 2A by the cover sensor 47, and counts the number of opening/closing operations since the previous execution of adjustment for color registration. The counted number NC is stored in the NVRAM 43. Further, the temperature TEMP during execution of adjustment for color registration is detected by the temperature sensor 48, and is stored in the NVRAM 43.

The CPU 40 detects rotations of the belt-drive roller 12B, and stores the number RB of rotations in the NVRAM 43. The CPU 40 further detects acceleration higher than a predetermined value by the acceleration sensor 50 since the previous execution of adjustment for color registration, and the value (i.e., voltage value) MA indicating the maximum detected acceleration is stored in the NVRAM 43.

As can be seen from the above, the variation values NC, TEMP, RB and MA individually indicate a different state variation capable of involving errors in color registration. These variation values NC, TEMP, RB and MA are used to set the PAU flag and the PAN flag during the determination process for adjustment execution, as described below.

At step S104 (i.e., immediately after the execution of adjustment at step S102), three of the stored variation values, i.e., the number NC of opening/closing operations, the number RB of rotations, and the maximum acceleration MA are reset to zero. The remaining one of the stored variation values, i.e., the temperature TEMP is replaced with the current temperature as a new temperature during adjustment. When the reset at step S104 is completed, then the present iteration of the printing and adjustment process terminates.

Returning to step S101, if it is determined that the PAU flag is OFF (i.e., "No" is determined at step S101), the process proceeds to step S105 where the CPU 40 determines whether the DAU flag is ON or OFF. If it is determined that the DAU flag is ON (i.e., "Yes" is determined at step S105), an adjustment process for image density is executed at step S106.

In the adjustment process for image density, the CPU 40 causes the image forming section 20 to form a pattern on the belt 13, which is used to measure image density errors. The density of the pattern is measured by the pattern sensor 15, and the CPU 40 calculates a density correction value for each color based on the result of the measurement. The density correction values for respective colors, currently stored in the NVRAM 43, are updated or replaced with the new density correction values.

In future operations for image formation, the density of images of respective colors are corrected based on the density correction values stored in the NVRAM 43, so that image density errors are prevented. Specifically, the intensity of light from the exposure units 17K to 17C is adjusted based on the density correction values during line scanning.

Returning to FIG. 4, when the adjustment process for image density at step S106 is completed, the present printing and adjustment process proceeds to step S107 where the DAU flag is set to OFF. Further, the CPU 40 resets two kinds of variation values (i.e., RH and RD) stored in the NVRAM 43, which indicate the humidity during adjustment and the numbers of rotations of the respective developer rollers 25, respectively.

The variation values RH and RD individually indicate a different state variation capable of involving errors in image density. These variation values RH and RD are used to set the DAU flag and the DAN flag during the determination process for adjustment execution, as described below.

Specifically, the humidity is detected by the humidity sensor 49 during execution of adjustment for image density, and the detected humidity RH is stored in the NVRAM 43. Further, the rotation of each developer roller 25 is detected during image development, and the CPU 40 counts the number of rotations of the developer roller 25 since the previous execution of adjustment for image density. The counted numbers RD of rotations of the respective developer rollers 25 are stored in the NVRAM 43.

At step S108 (i.e., immediately after the execution of adjustment at step S106), the stored value RH indicating the humidity is updated or replaced with a new value indicating the current humidity detected by the humidity sensor 49, and the numbers RD of rotations are reset to zero. When the reset at step S108 is completed, then the present iteration of the printing and adjustment process terminates.

Returning to step S105, if it is determined that the DAU flag is OFF (i.e., "No" is determined at step S105), the process proceeds to step S109 where it is determined whether the CPU 40 has a print job to be done. The print job can be submitted from an external computer, for example, and the CPU 40 can receive the print instruction therefor via the network interface 44. Alternatively, the print job can be submitted by a user operation on the operation section 46 (i.e., an example of "a specifying portion").

If it is determined that the CPU 40 has a print job (i.e., "Yes" is determined at step S109), the print job is executed at step S110. During the execution of the print job, the line scanning by respective exposure units 17K to 17C is adjusted based on the position correction values and the density correction values stored in the NVRAM 43, so that color registration errors and image density errors can be prevented. When the execution of the print job at step S110 is completed, then the present iteration of the printing and adjustment process terminates.

If it is determined that the CPU 40 has no print job to be done (i.e., "No" is determined at step S109), the process proceeds to step S111 where it is determined whether the PAN flag is ON or OFF. If it is determined that the PAN flag is ON, an adjustment process for color registration shown in FIG. 5 is executed at step S112, in a similar manner to step S102. When the adjustment process at step S112 is completed, the PAN flag is set to OFF at step S113.

At step S114, the CPU 40 resets the variation values NC, TEMP, RB and MA stored in the NVRAM 43, in a similar manner to step S104. When the reset at step S114 is completed, then the present iteration of the printing and adjustment process terminates.

Returning to step S111, if it is determined that the PAN flag is OFF (i.e., "No" is determined at step S111), the process proceeds to step S115 where it is determined whether the DAN flag is ON or OFF. If it is determined that the DAN flag is ON (i.e., "Yes" is determined at step S115), an adjustment process for image density is executed at step S116, in a similar manner to step S106. When the adjustment process at step S116 is completed, the DAN flag is set to OFF at step S117.

At step S118, the CPU 40 resets the variation values RH and RD stored in the NVRAM 43, in a similar mariner to step S108. When the reset at step S118 is completed, then the present iteration of the printing and adjustment process terminates. When "No" is determined at step S115 (i.e., when the DAN flag is OFF), steps S116 to S118 are skipped and the present iteration of the printing and adjustment process terminates.

As explained above, when the PAU flag or DAU flag (i.e., Adjustment Urgency flag) is ON, an adjustment process for color registration or image density is executed in priority to a print job, if any. When the PAN flag or DAN flag is ON, an adjustment process for color registration or image density is executed while the printer 1 is in the idle state or after a print job is completed, if any.

(Determination Process for Adjustment Execution)

Figure 8:
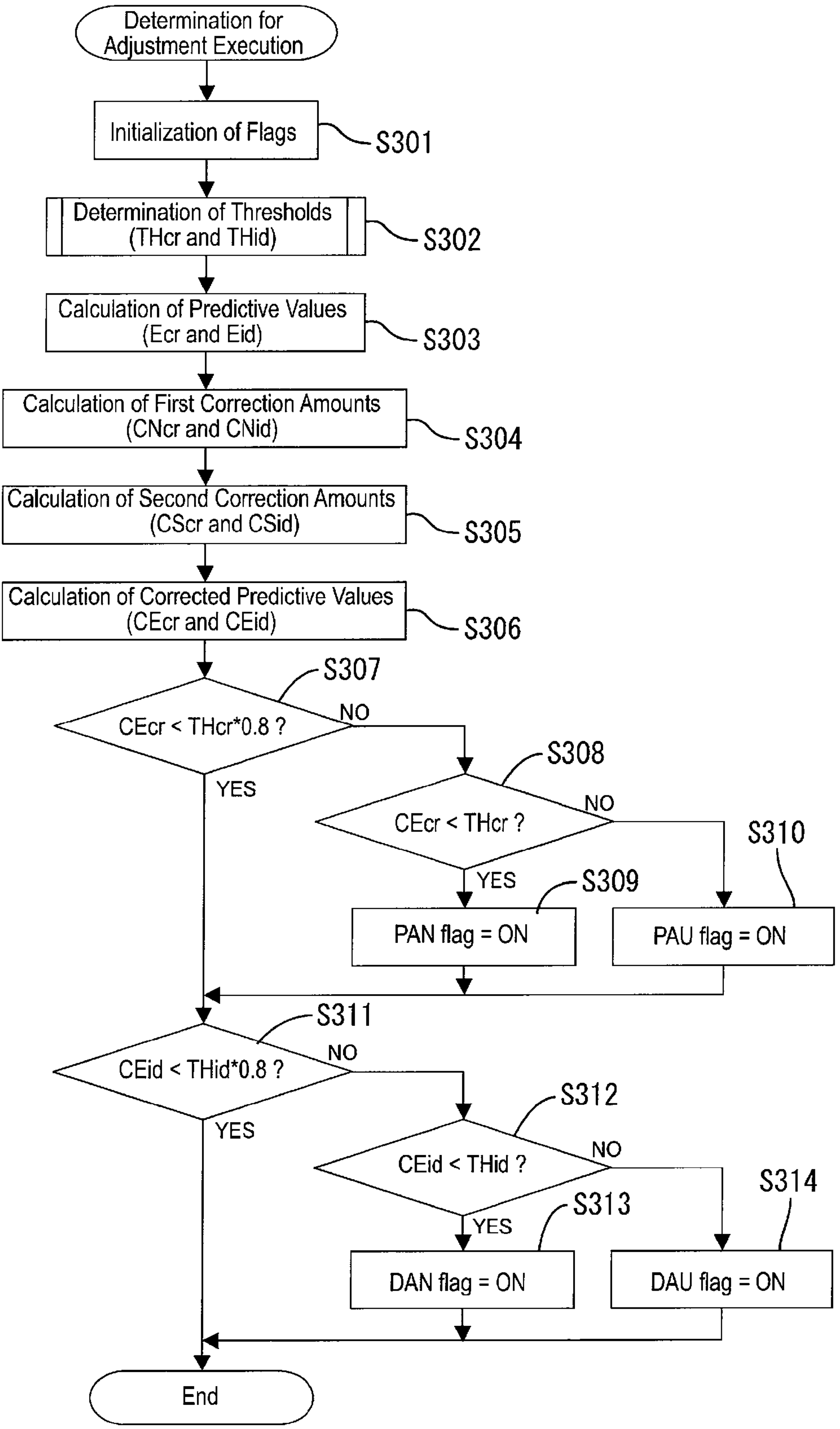
FIG. 8 is a flowchart of a determination process for adjustment execution.
Figure 9:
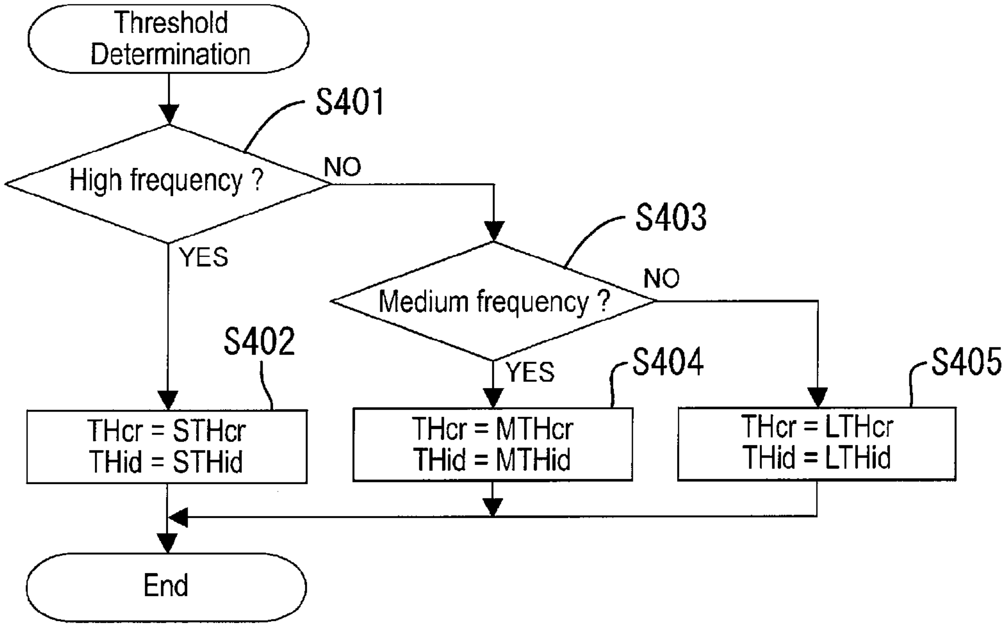
FIG. 9 is a flowchart of a threshold determination process.
Figure 10:
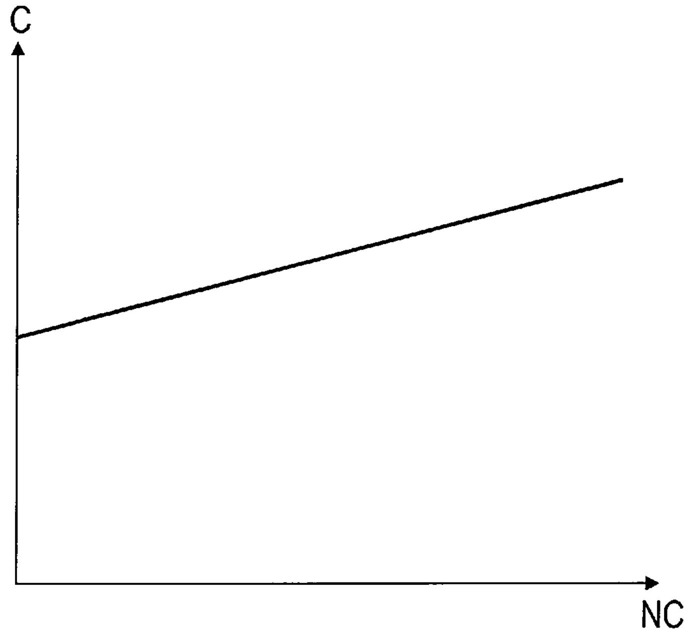
FIG. 10 is a graph showing the relationship between the number of opening/closing operations of a cover and a coefficient "C" (representing an estimated amount of the color registration error caused by one opening/closing operation).

FIG. 8 is a flowchart of a determination process for adjustment execution. FIG. 9 is a flowchart of a threshold determination process to be executed during the determination process for adjustment execution. FIG. 10 is a graph showing the relationship between the number NC of opening/closing operations of the cover 2A and a coefficient "C" (representing an estimated amount of the color registration error caused by one opening/closing operation), which is used to estimate color registration errors during the determination process for adjustment execution.

The determination process for adjustment execution is periodically executed by the CPU 40 (i.e., an example of an acquisition portion, a calculation portion and a determination portion) when the printer 1 is ON, and thereby the four flags (i.e., the PAU, PAN, DAU and DAN flags) are set to control the starting time for adjustment for color registration or image density.

In the determination process for adjustment execution, a predictive value of color registration errors is calculated as an evaluation of the degree of demand for adjustment of color registration, while a predictive value of image density errors is calculated as an evaluation of the degree of demand for adjustment of image density. The flags are set based on comparison of the calculated predictive values with thresholds.

Referring to FIG. 8, during the determination process for adjustment execution, the CPU 40 first initializes the flags at step S301, and thereby all the flags (i.e., the PAU, PAN, DAU and DAN flags) are set to OFF. Next, a threshold determination process is executed at step S302, so as to determine the values of two thresholds THcr, THid to be compared with the respective predictive values of color registration errors and image density errors.

By the threshold determination process, each of the two thresholds THcr, THid can be set to one of three predetermined values, i.e., a small value (STHcr or STHid), a medium value (MTHcr or MTHid) or a large value (LTHcr or LTHid), based on the print quality specified by the user, as shown in FIG. 9, for example.

The user can select "High Quality" or "Normal Quality" when he/she submits a print job, for example, from an external computer. The CPU 40 stores the information on the specified quality in the NVRAM 43, every time a new print job is submitted. During the threshold determination process, the CPU 40 calculates the frequency or ratio of high-quality printing in print jobs submitted in the past month, using the above information on the specified quality. The calculated frequency of high-quality printing, which indicates the possibility that "High Quality" is specified by the user, is used to determine the values of the thresholds THcr and THid, as follows.

Referring to FIG. 9, the calculated frequency of high-quality printing is ranked in one of three categories, i.e., "high frequency", "medium frequency" and "low frequency". Specifically, the CPU 40 determines at step S401 whether the calculated frequency of high-quality printing is in the high-frequency category. If it is determined that the calculated frequency is in the high-frequency category (i.e., "Yes" is determined at step S401), the two thresholds THcr and THid are individually set to a predetermined small value STHcr, STHid at step S402.

If "No" is determined at step S401, the process proceeds to step S403 where it is determined whether the calculated frequency of high-quality printing is in the medium-frequency category. If it is determined that the calculated frequency is in the medium-frequency category (i.e., "Yes" is determined at step S403), the two thresholds THcr and THid are individually set to a predetermined medium value MTHcr, MTHid at step S404.

If "No" is determined at step S403 (i.e., the calculated frequency is in the low-frequency category), the two thresholds THcr and THid are individually set to a predetermined large value LTHcr, LTHid at step S405.

The thresholds THcr and THid are thus set to be smaller when the frequency of high-quality printing is higher, so that the chance of execution of adjustment for color registration or image density increases.

In the case that an administrator of the printer 1 can specify the print quality, the information on the print quality specified by the printer administrator may be stored and used to determine the values of the thresholds THcr, THid, instead of the above information on the print quality specified by individual users at times of print jobs.

Further, in the threshold determination process, the frequency of color printing may be calculated and used to determine the values of the thresholds THcr, THid, instead of the frequency of high-quality printing. This is because the high-quality printing is more likely to be required when color printing is specified than when monochrome printing is specified. Therefore, it is preferable to set the thresholds THcr, THid to smaller values and thereby increase the chance of execution of adjustment when the frequency of color printing is high.

Moreover, the information on a plurality of user-settable printing conditions, such as "Print Quality" and "Color/Monochrome", may be used in combination, in order to determine the values of the thresholds THcr, THid.

Returning to FIG. 8, when the threshold determination at step S302 is completed, the process proceeds to step S303 where the CPU 40 calculates a predictive value "Ecr" of factor-dependent errors in color registration and a predictive value "Eid" of factor-dependent errors in image density.

For example, the predictive value "Ecr" of factor-dependent errors in color registration can be calculated using the following formula (1):

$$Ecr=(C^*\mathrm{NC})+(T^*\mathrm{TV})+(B^*\mathrm{RB})+(S^*\mathrm{MA}) \qquad \text{Formula (1)}$$

where "NC" is the number of opening/closing operations of the cover 2A, "TV" is a temperature variation, "RB" is the number of rotations of the belt-drive roller 12B, "MA" is the maximum detected acceleration, and "C", "T", "B" and "S" are coefficients.

Specifically, the number NC of opening/closing operations of the cover 2A and the number RB of rotations of the belt-drive roller 12B are counted since the previous execution of adjustment for color registration, and are stored in the NVRAM 43, as described above. The maximum detected acceleration MA since the previous execution of the adjustment is also stored in the NVRAM 43. The temperature variation TV since the previous execution of the adjustment can be calculated based on the current temperature detected by the temperature sensor 48 and the stored temperature (i.e., the temperature detected during the previous execution of the adjustment).

The coefficient "C" represents an estimated amount of the color registration error caused by one opening/closing operation. The coefficient "T" represents an estimated amount of the color registration error caused per unit of temperature variation. The coefficient "B" represents an estimated amount of the color registration error caused by one rotation of the belt-drive roller 12B. The coefficient "S" represents an estimated amount of the color registration error caused per unit of acceleration (or per unit of voltage indicating the acceleration).

The predictive value Ecr of factor-dependent errors in color registration is a complex evaluation of color registration errors, as can be seen from the above formula (1). That is, the predictive value Ecr is calculated as the sum of simple evaluations. The simple evaluations are individually determined based on different kinds of variation values, and therefore individually indicate an estimated amount of the color registration error caused by different factors.

The number NC of opening/closing operations of the cover 2A, the temperature variation TV, the number RB of rotations of the belt-drive roller 12B, and the maximum detected acceleration MA are examples of variation values, which individually indicate a different state variation capable of involving a state change in color registration. In the present illustrative aspect, each of the simple evaluations is calculated using the coefficient "C", "T", "B" or "S" to be multiplied by the variation value NC, TV, RB or MA, as can be seen from the formula (1).

The predictive value Ecr as a complex evaluation includes four kinds of simple evaluations, i.e., an estimated amount of the color registration error caused by vibration due to opening/closing operations of the cover 2A, an estimated amount of the color registration error caused by expansion or contraction of components due to temperature variation, an estimated amount of the color registration error caused by wear of components due to repeated rotation of the belt 13, and an estimated amount of the color registration error caused by a shock or acceleration applied to the printer 1.

On the other hand, the predictive value Eid of factor-dependent errors in image density can be calculated, for example, using the following formula (2):

$$Eid=(H^*\mathrm{HV})+(D^*\mathrm{MRD}) \qquad \text{Formula (2)}$$

where "HV" is a humidity variation, "MRD" is the maximum number of rotations of the developer rollers 25, and "H" and "D" are coefficients.

Specifically, the numbers RD of rotations of the respective developer rollers 25 are counted since the previous execution of adjustment for image density, and are stored in the NVRAM 43, as described above. The maximum number MRD of rotations of the developer rollers 25 can be obtained by retrieving the largest of the stored numbers RD. The humidity variation HV since the previous execution of the adjustment can be calculated based on the current humidity detected by the humidity sensor 49 and the stored humidity RH (i.e., the humidity detected during the previous execution of the adjustment).

The coefficient "H" represents an estimated amount of the image density error caused per unit of humidity variation. The coefficient "D" represents an estimated amount of the image density error caused by one rotation of the developer roller 25.

The predictive value Eid of factor-dependent errors in image density is a complex evaluation of image density errors, as can be seen from the above formula (2). That is, the predictive value Eid is calculated as the sum of simple evaluations. The simple evaluations are individually determined based on different kinds of variation values, and therefore individually indicate an estimated mount of the image density error caused by different factors.

The humidity variation HV and the maximum number MRD of rotations of the developer rollers 25 are examples of variation values, which individually indicate a different state variation capable of involving a state change in image density. In the present illustrative aspect, each of the simple evaluations is calculated using the coefficient "H" or "D" to be multiplied by the variation value HV or MRD, as can be seen from the formula (2).

The predictive value Eid as a complex evaluation includes two kinds of simple evaluations, i.e., an estimated amount of the image density error caused by humidity variation and an estimated amount of the image density error mainly caused by degradation of toner due to repeated rotation of the developer rollers 25. Thus, the predictive value Eid of factor-dependent errors in image density can be calculated based on the variation values differing from those used to calculate the predictive value Ecr of factor-dependent errors in color registration.

The coefficients "C", "T", "B", "S", "H" and "D" can be constant coefficients. However, some of them may be variable coefficients. For example, the coefficient "C" (representing an estimated amount of the color registration error caused by one opening/closing operation of the cover 2A) can be set to vary with the number NC of opening/closing operations of the cover 2A. More specifically, the coefficient "C" can be set to increase with increase in the number NC of opening/closing operations of the cover 2A, as shown in FIG. 10.

Similarly, the coefficient "S" (representing an estimated amount of the color registration error caused per unit of acceleration or per unit of voltage indicating the acceleration) can be set to increase with increase in the number of printed sheets (i.e., the number of sheets used for printing by the printer 1 since the first use of the printer 1 or since the previous component replacement), for example. This is because the amount of the color registration error caused per unit of acceleration applied to the printer 1 may increase due to the backlash in the printer 1 resulting from degradation (e.g., wear) of components caused by repeated printing operations.

Returning to FIG. 8, when the calculation of the predictive values Ecr, Eid at step S303 is completed, the process proceeds to step S304 where first correction amounts CNcr, CNid are determined based on the amount of noise that was detected during the previous execution of adjustment for color registration. The first correction amounts CNcr, CNid are used to correct the predictive values Ecr, Eid at a later step, so that the chance of execution of adjustment increases with increase in amount of detected noise. This is because the accuracy of adjustment may be reduced when a large amount of noise is detected. Therefore, it is preferable to increase the chance of execution of adjustment if the detected noise is large in amount.

For example, the first correction amounts CNcr, CNid can be individually set to a predetermined positive constant value when the amount of noise detected during the previous execution of adjustment for color registration is equal to or larger than a predetermined reference value. When the amount of detected noise is smaller than the predetermined reference value, the correction amounts CNcr, CNid can be set to zero.

Next, at step S305, the CPU 40 calculates second correction amounts CScr, CSid based on the sensitivity correction amount that was calculated and used during the previous sensitivity correction (for example, at step S202 of the adjustment process for color registration). The second correction amounts CScr, CSid are used to correct the predictive values Ecr, Eid at a later step, so that the chance of execution of adjustment increases with increase in sensitivity correction amount. This is because increase in sensitivity correction amount may result from degradation of the belt 13 involving reduction in optical reflectivity of the face of the belt 13. Therefore, it is preferable to increase the chance of execution of adjustment if the sensitivity correction amount is large probably due to degradation of the belt 13.

For example, the second correction amounts CScr, CSid can be calculated using the following formulae (3) and (4):

$$CScr=Lcr*CL \quad \text{Formula (3)}$$

$$CSid=Lid*CL \quad \text{Formula (4)}$$

where "CL" is the sensitivity correction amount, and "Lcr" and "Lid" are coefficients.

Specifically, the sensitivity correction amount CL represents the difference between the current set value and the initial set value for light emission of the pattern sensor 15, which can be obtained by subtracting the initial light intensity (or PWM value) at the time of manufacture of the printer 1 from the current light intensity (or PWM value) that was set during the previous sensitivity correction. The coefficients Lcr, Lid are individually set to a predetermined constant value, in the present illustrative aspect.

Next, at step S306, the CPU 40 calculates a corrected predictive value "CEcr" of color registration errors and a corrected predictive value "CEid" of image density errors by correcting the predictive values Ecr, Eid using the first correction amounts CNcr, CNid and the second correction amounts CScr, CSid. The corrected predictive values CEcr, CEid can be calculated according to the following formulae (5) and (6):

$$CEcr=Ecr+CNcr+CScr \quad \text{Formula (5)}$$

$$CEid=Eid+CNid+CSid \quad \text{Formula (6).}$$

When the calculation of the corrected predictive values CEcr, CEid at step S306 is completed, the CPU 40 sets the PAU flag and PAN flag at steps S307 to S310, and further sets the DAU flag and PAN flag at steps S311 to S314, by comparing the corrected predictive values CEcr, CEid with the respective thresholds THcr,THid (determined at step S302).

Specifically, when the corrected predictive value CEcr is smaller than the product of 0.8 and the threshold THcr (i.e., when "Yes" is determined at step S307), the PAU flag and PAN flag are left OFF (i.e., steps S308 to S310 are skipped). When the corrected predictive value CEcr is equal to or larger than the product of 0.8 and the threshold THcr, and is smaller than the threshold THcr (i.e., when "Yes" is determined at step S308), the PAN flag is set to ON at step S309. When the corrected predictive value CEcr is equal to or larger than the threshold THcr (i.e., when "No" is determined at step S308), the PAU flag is set to ON at step S310.

Similarly, when the corrected predictive value CEid is smaller than the product of 0.8 and the threshold THid (i.e., when "Yes" is determined at step S311), the DAU flag and DAN flag are left OFF (i.e., steps S312 to S314 are skipped). When the corrected predictive value CEid is equal to or larger than the product of 0.8 and the threshold THid, and is smaller than the threshold THid (i.e., when "Yes" is determined at step S312), the DAN flag is set to ON at step S313. When the corrected predictive value CEid is equal to or larger than the threshold THid (i.e., when "No" is determined at step S312), the DAU flag is set to ON at step S314.

When the setting of the flags at steps S307 to S314 is completed, then the present iteration of the determination process for adjustment execution terminates.

As explained above, according to the present determination process for adjustment execution, the predictive values Ecr, Eid of factor-dependent errors in color registration or image density are corrected by the first correction amounts CNcr, CNid and the second correction amounts CScr, CSid, before being used for setting the flags. Thereby, the starting time for execution of adjustment for color registration or image density can be adequately controlled depending on the state of the printer 1.

For example, assuming that the threshold THcr for adjustment of color registration is set to "100", the adjustment for color registration can be executed in priority to a print job if the predictive value Ecr of factor-dependent errors in color registration has reached "100", while the printer 1 is new (i.e., both of the first and second correction amounts CNcr, CScr can be zero). However, when the first and second correction amounts CNcr, CScr have increased to a total of "20" due to degradation of various components of the printer 1, the adjustment for color registration can be executed in priority to a print job if the predictive value Ecr of factor-dependent errors in color registration has reached "80".

(Effect of the Present Illustrative Aspect)

According to the present illustrative aspect, a complex evaluation of the current state (e.g., represented by errors) of a pre-selected adjustable image forming condition (e.g., color registration or image density) is calculated based on a plurality of kinds of variation values, which individually indicate a different state variation capable of involving a state change in the pre-selected adjustable image forming condition. The starting time for execution of adjustment for correcting the pre-selected adjustable image forming condition is determined based on the calculated complex evaluation.

That is, the complex evaluation is determined by considering a number of different factors, and is provided as a multidimensional evaluation on the degree of demand for the adjustment. The starting time for the adjustment can be more adequately controlled based on the multidimensional evaluation, compared to determining the starting time for adjustment based on a simple evaluation as a conventional method. Consequently, the quality of an image to be formed by the printer 1 can be maintained at the required level due to the adjustment, while the frequency of execution of the adjustment is suppressed.

The complex evaluation is calculated as the sum of a plurality of simple evaluations, which are individually calculated based on the respective variation values described above. Each of the simple evaluations indicates an estimated state change (i.e., estimated error) of the pre-selected adjustable image forming condition attributable to the state variation indicated by the corresponding one of the variation values.

That is, the errors caused by the various factors are properly reflected in the complex evaluation (calculated as the sum of the simple evaluations), and therefore the complex evaluation can be provided as a reliable evaluation. Consequently, the starting time for the adjustment can be more adequately controlled based on the reliable complex evaluation.

Each of the simple evaluations can be calculated using a coefficient to be multiplied by the corresponding one of the variation values, and the coefficient may be a variable coefficient. For example, the coefficient "C" (representing an estimated amount of the color registration error caused by one opening/closing operation of the cover 2A) can be a variable coefficient that increases with increase in the number of opening/closing operations of the cover 2A.

The simple evaluations, thus calculated using the coefficients including variable coefficients, can be provided as reliable evaluations. Consequently, the complex evaluation, calculated as the sum of the simple evaluations, can be also provided as a reliable evaluation, and the starting time for the adjustment can be more adequately controlled based on the reliable complex evaluation.

The image forming apparatus can execute at least two kinds of adjustment, including adjustment for correcting errors in image forming position (e.g., errors in color registration) and adjustment for correcting errors in image density. The starting time for each adjustment is determined independently from the starting time for other kinds of adjustment.

Some troubles such as prolongation of user waiting time may be caused by simultaneous execution of different kinds of adjustment. However, in the present illustrative aspect, the starting time for adjustment for color registration is determined independently from the starting time for adjustment for image density, so that simultaneous execution thereof or execution of less urgent adjustment can be prevented. Consequently, the troubles such as prolongation of user waiting time, which may be caused by simultaneous execution of different kinds of adjustment, can be prevented.

The starting time for each adjustment is determined based on the variation values, which differ from those to be used for determination of the starting time for other kinds of adjustment. That is, the variation values to be used for calculation of the complex evaluation of color registration errors differ from the variation values to be used for calculation of the complex evaluation of image density errors, in the present illustrative aspect.

The complex evaluation is thus calculated based on the variation values appropriately selected for each adjustment, and therefore is provided as a reliable evaluation. Consequently, the starting time for each adjustment can be more adequately controlled based on the reliable complex evaluation.

The number of movement of the movable member (e.g., the number of opening/closing operations of the cover 2A) is counted by a counter (e.g., CPU 40), and the counted number is used as one of the variation values for calculation of the complex evaluation of errors in image forming position (e.g., errors in color registration).

The vibration due to movement of the movable member (e.g., due to opening/closing operations of the cover 2A) can cause errors in image forming position. In view of this, the number of movement of the movable member is counted and used to determine the complex evaluation of errors in color registration. Consequently, the errors caused by the movement of the movable member can be properly reflected in the complex evaluation, and the starting time for adjustment of image forming position can be more adequately controlled based the complex evaluation.

On the other hand, the humidity variation can cause errors in image density. In view of this, the variation in humidity detected by the humidity sensor 49 is used as one of the variation values for calculation of the complex evaluation of errors in image density. Consequently, the errors caused by the humidity variation can be properly reflected in the complex evaluation, and the starting time for adjustment of image density can be more adequately controlled based the complex evaluation.

The threshold to be used to determine the starting time for adjustment is modified so that the chance of execution of the adjustment increases with increase of the image quality specified by a user. Thereby, more timely execution of adjustment can be achieved so that the image quality can be maintained at the required level even if the high quality printing is specified by the user.

Specifically, the possibility (e.g., frequency) of the high quality printing is calculated, and the threshold is modified so that the chance of execution of the adjustment increases with increase of the calculated possibility. Thereby, more timely execution of adjustment is achieved so that the image quality can be maintained at the required level even when the high quality printing is specified with a high probability.

During the adjustment, the measurement noise is detected while an image (e.g., pattern) is measured to determine the actual error amounts. During the determination process for determining the starting time for the next execution of adjustment, the complex evaluation is modified before being used for determination, so that the chance of execution of adjustment increases with increase in amount of the detected measurement noise.

This is because the increase in amount of the measurement noise can result in reduction in adjustment accuracy. In order to offset the reduction in adjustment accuracy, the complex evaluation is modified so as to accelerate the next execution of adjustment. Thereby, more timely execution of adjustment is achieved so that the image quality can be maintained at the required level even when the adjustment accuracy has been reduced.

During the adjustment, the sensitivity of an optical sensor (e.g., pattern sensor 15) is corrected according to the optical reflectivity of a carrier (e.g., belt 13) before the sensor 15 is used to measure a pattern formed on the belt 13 for determining the actual error amounts. During the determination process for determining the starting time for the next execution of adjustment, the complex evaluation is modified before being used for determination, so that the chance of execution of adjustment increases with increase in correction amount for the sensitivity of the sensor 15.

This is because the increase in correction amount may result from reduction in optical reflectivity of the belt 13 due to degradation of the belt 13. In view of acceleration of errors due to the degradation of the belt 13, the complex evaluation is modified so as to accelerate the next execution of adjustment. Thereby, more timely execution of adjustment is achieved so that the image quality can be maintained at the required level even when the belt 13 has degraded.

<Other Illustrative Aspects>

The present invention is not limited to the aspects explained in the above description made with reference to the drawings. The following aspects may be included in the technical scope of the present invention, for example.

(1) The variation values to be used for calculation of the complex evaluation (i.e., the predictive value Ecr, Eid of factor-dependent errors in image forming position or image density) are not limited to the variation values described above. For example, the number of printed sheets can be counted since the previous execution of adjustment, and the counted number may be used for calculation of the complex evaluation, instead of the number of rotations of the belt-drive roller 12B or the numbers of rotations of the developer rollers 25.

Further, the formulae (1) to (6) to be used for calculation of the corrected predictive values CEcr, CEid of errors in image forming position or image density (including those to be used for calculation of the predictive values Ecr, Eid of factor-dependent errors and those to be used for calculation of the first correction amounts CNcr, CNid and second correction amounts CScr, CSid) may be variously modified within the scope of the invention.

For example, the complex evaluation (e.g., the predictive value of factor-dependent errors) may be expressed by an n-th degree polynomial ($n>1$) that consists of terms corresponding to respective simple evaluations, in contrast to the first degree polynomial of the above aspect. That is, at least one of the simple evaluations may be expressed by an n-th degree monomial ($n>1$).

Alternatively, the complex evaluation may be expressed by an n-th degree polynomial ($n>1$) with variables representing the above variation values, in which at least one of the terms contains the product of simple evaluations. Further, at least one of the simple evaluations may be expressed by an n-th degree polynomial ($n \geqq 1$) with a major variable (representing one of the above variation values) and other minor variables, in contrast to the first degree monomial of the above aspect.

(2) In the above aspect, the errors in color registration are corrected by the adjustment, so that a color image on a sheet as a printing result will not include a color shift caused by color registration errors. Alternatively or additionally, errors in image forming position on a sheet may be corrected by adjustment, so that an image can be accurately positioned on the sheet.

(3) In the above aspect, the adjustment is intended to correct color registration errors or image density errors caused by time degradation of the image forming section 20. However, adjustment may be intended to correct errors in image forming position (including errors in image forming position on a sheet and errors in color registration) caused by rotational fluctuation of the belt 13.

In the above aspect, the errors or displacement in the secondary scanning direction D2 are corrected by the adjustment for color registration. Alternatively or additionally, errors or displacement in the main scanning direction D1 may be corrected by adjustment using a pattern. The configuration of a pattern to be used for adjustment (i.e., the arrangement, shapes and colors of marks thereof) can be appropriately varied according to the kind of errors to be corrected.

(4) In the above aspect, a color LED printer of a direct-transfer tandem type is shown for illustrative purposes. However, the present invention can be applied to other types of image forming apparatuses, such as an intermediate-transfer type, a 4-cycle type, or an ink-jet type. Further, the present invention (except for adjustment of color registration) can be applied to a monochrome image forming apparatus, as well as a color image forming apparatus.

(5) In the above aspect, the printing and adjustment process and the determination process for adjustment execution are executed by the CPU 40 included in the printer 1. However, these processes may be executed by a CPU included in an external computer (such as a personal computer or a print server) connected to the printer 1.

What is claimed is:

1. An image forming apparatus comprising:

an image forming device configured to form an image;

a computing device; and memory having computer executable instructions stored therein that, when executed by the computing device, cause the image forming apparatus to perform operations including:

executing at least image forming position adjustment for correcting an image forming position and image density adjustment for correcting an image density;

calculating a single predictive error value for each of a first plurality of variation values and a second plurality of variation values, different from the first plurality of variation values, to obtain a plurality of single predictive error values;

calculating a predictive position error value by combining the plurality of single predictive error values for each of the first plurality of variation values;

calculating a predictive density error value by combining the plurality of single predictive error values for each of the second plurality of variation values;

determining a timing of execution of the image forming position adjustment based on the predictive position error value; and determining a timing of execution of the image density adjustment based on the predictive density error value.

2. The image forming apparatus as in claim 1, wherein each single predictive error value is calculated by multiplying each variation value by a variable coefficient.

3. The image forming apparatus as in claim 1, further comprising:

a movable member, wherein the computer executable instructions, when executed, further cause the image forming apparatus to perform operations including counting a number of movement of the movable member to obtain a counter value, the variation values including the counter value.

4. The image forming apparatus as in claim 1, further comprising:

an atmosphere sensor configured to detect at least one of a humidity value and a temperature value, wherein the variation values include the at least one of the humidity value and the temperature value.

5. The image forming apparatus as in claim 1, wherein the computer executable instructions, when executed, further cause the image forming apparatus to perform operations including:

determining a position threshold value for correcting the image forming position and a density threshold value for correcting the image density;

comparing the predictive position error value and the position threshold value and comparing the predictive density error value and the density threshold value; and determining the timing of execution of each of the image forming position adjustment and the image density adjustment based on a corresponding comparison result obtained by comparing the predictive position error value and the position threshold value and comparing the predictive density error value and the density threshold value.

6. The image forming apparatus as in claim 5, wherein the computer executable instructions, when executed, further cause the image forming apparatus to perform operations including:

setting a high image quality of the image to be formed by the image forming device;

determining a frequency of setting the high image quality; and determining the threshold value to be lower as the determined frequency is higher.

7. The image forming apparatus as in claim 1, wherein the computer executable instructions, when executed, further cause the image forming apparatus to perform operations including:

obtaining a correction value based on one of a noise amount and sensitivity;

calculating a corrected predictive error value based on the correction value and one of the predictive position error value and the predictive density error value; and determining the timing of execution of one of the image forming position adjustment and the image density adjustment based on the corrected predictive error value calculated based on the correction value and one of the predictive position error value and the predictive density error value.

8. The image forming apparatus as in claim 7, wherein the computer executable instructions, when executed, further cause the image forming apparatus to perform operations including:

obtaining the noise amount caused in the image forming apparatus; and determining the timing of execution of one of the image forming position adjustment and the image density adjustment based on the corrected predictive error value to be earlier as the obtained noise amount becomes greater.

9. The image forming apparatus as in claim 7, wherein the image forming device includes a carrier and forms the image on the carrier, the image forming apparatus further comprising:

an optical sensor configured to detect the image formed on the carrier to obtain optical reflectivity, wherein the computer executable instructions, when executed, further cause the image forming apparatus to perform operations including:

obtaining the correction value based on the optical reflectivity obtained by the optical sensor for correcting the sensitivity of the optical sensor; and determining the timing of execution of one of the image forming position adjustment and the image density adjustment based on the corrected predictive error value to be earlier as the obtained correction value becomes greater.

10. An adjustment controller comprising:

a computing unit; and a memory having computer executable instructions stored thereon that, when executed by the computing unit, perform operations comprising:

executing at least image forming position adjustment for correcting an image forming position and image density adjustment for correcting an image density;

calculating a single predictive error value for each of a first plurality of variation values and a second plurality of variation values, different from the first plurality of variation values, to obtain a plurality of single predictive error values;

calculating a predictive position error value by combining the plurality of single predictive error values for each of the first plurality of variation values;

calculating a predictive density error value by combining the plurality of single predictive error values for each of the second plurality of variation values;

determining a timing of execution of the image forming position adjustment based on the predictive position error value; and determining a timing of execution of the image density adjustment based on the predictive density error value.

11. An adjustment control method comprising:

executing at least image forming position adjustment for correcting an image forming position and image density adjustment for correcting an image density;

calculating a single predictive error value for each of a first plurality of variation values and a second plurality of variation values, different from the first plurality of variation values, to obtain a plurality of single predictive error values;

calculating a predictive position error value by combining the plurality of single predictive error values for each of the first plurality of variation values;

calculating a predictive density error value by combining the plurality of single predictive error values for each of the second plurality of variation values;

determining a timing of execution of the image forming position adjustment based on the predictive position error value; and determining a timing of execution of the image density adjustment based on the predictive density error value.

12. The adjustment control method as in claim 11, wherein each single predictive error value is calculated by multiplying each variation value by a variable coefficient.

13. The adjustment control method as in claim 11, further comprising:

counting a number of movement of a movable member, if the image forming position adjustment is to be executed for correcting an image forming position; and obtaining a counter value from the counting, the variation values including the counter value.

14. The adjustment control method as in claim 11, further comprising:

detecting at least one of a humidity value and a temperature value in an image forming apparatus, if the image density adjustment is to be executed for correcting the image density;

wherein the variation values include the at least one of the humidity value and the temperature value.

15. A computer readable storage medium including an adjustment control program stored thereon to implement an adjustment control method on a computer connected to an image forming apparatus, the program, when executed by the computer, performing operations comprising:

executing at least image forming position adjustment for correcting an image forming position and image density adjustment for correcting an image density;

calculating a single predictive error value for each of a first plurality of variation values and a second plurality of variation values, different from the first plurality of variation values, to obtain a plurality of single predictive error values;

calculating a predictive position error value by combining the plurality of single predictive error values for each of the first plurality of variation values;

calculating a predictive density error value by combining the plurality of single predictive error values for each of the second plurality of variation values;

determining a timing of execution of the image forming position adjustment based on the predictive position error value; and determining a timing of execution of the image density adjustment based on the predictive density error value.

16. The image forming apparatus as in claim 3, wherein the movable member includes one of a cover of the image forming apparatus, a belt-driver roller, and a developer roller; and the counting includes counting one of a number of opening/closing operations of the cover, a number of rotations of the belt-driver roller, and a number of rotations of the developer roller.

* * * * *